Patented Aug. 14, 1945

2,381,889

UNITED STATES PATENT OFFICE 2,381,889

ESTERS

Merlin Martin Brubaker, Boothwyn, Pa., assignor to E. I. du Pont de Nemours & Company, Wilmington, Del., a corporation of Delaware No Drawing. Application April 30, 1942, Serial No. 441,226

9 Claims. (Cl. 260—327)

This invention relates to new synthetic drying oils and to coating compositions containing them.

The higher grade natural drying oils, such as China-wood, perilla, and oiticica oils, are for the most part imported and are subject to wide fluctuation in price, quality, and availability. Some of these oils also have a tendency to form films which "crystallize" or "frost." Previous attempts to provide synthetic substitutes having the desirable film-forming properties of these natural oils have been for the most part unsuccessful in one or more ways.

This invention accordingly has as its general objective the preparation of new esters which can be substituted for the rapidly drying natural fatty oils in coating compositions into which fatty oils are ordinarily formulated.

Another objective is the preparation of new esters having film-forming properties, especially drying rates, hardness, and toughness, of about the same order as, or better than, those of the natural drying oils.

A further objective is the proper combination of polyhydric alcohol and monocarboxylic acids which will give esters having such properties.

A still further objective is the preparation of esters from those monocarboxylic acids which have the particular types of polyunsaturation, and other elements of chemical structure, which will impart rapid drying film properties to said esters.

An additional objective is the provision of methods for making these new esters.

Another objective is the preparation of new and improved coating compositions containing these new esters.

The above and other objects appearing hereinafter are accomplished by preparing polyhydric alcohol esters of a monofunctional thienylacrylic acid. These esters can be simple esters, or they can be mixed esters involving different thienylacrylic acids or a thienylacrylic acid and another monofunctional monocarboxylic acid, preferably an unsaturated acid, such as drying oil acids. These latter products are polyhydric alcohol mixed esters, the acyl radicals of which comprise those of a thienylacrylic acid and a monofunctional monocarboxylic acid of different structure.

The expression "a thienylacrylic acid" is used in a generic sense to include any monocarboxylic acid having an ethylenic double bond between the $\alpha$ and $\beta$ carbon atoms, and a thienyl group attached either to the $\alpha$ or $\beta$ carbon atom, or to both. The thienyl groups can be attached at any position on the thiophene ring. The thienylacrylic acids can have inert (i. e., non-esterifiable) substituents on the $\alpha$ or $\beta$ carbon atom or on the thiophene ring and, if there are several substituents, they can be the same or different. The term "monofunctional" means that the acid referred to contains no group, such as amino, hydroxyl, or sulfhydryl, which is known to be capable of undergoing reaction with the carboxyl group under normal esterification conditions.

The polyhydric alcohol simple esters of this invention, i. e., esters with a single thienylacrylic acid and no other monocarboxylic acid, can be made by direct esterification of the polyhydric alcohol with the thienylacrylic acid. An example is the glyceride of $\beta$-(2-thienyl) acrylic acid.

A preferred method of preparing the polyhydric alcohol mixed esters of the invention involves the simultaneous reaction of a polyhydric alcohol, a polyhydric alcohol ester such as a drying or semi-drying oil, and sufficient thienylacrylic acid to esterify the free hydroxyl groups present in this mixture. These ingredients undergo simultaneous esterification and ester interchange.

Another preferred method of preparing the polyhydric alcohol mixed esters involves the alcoholysis of the polyhydric alcohol ester of either the thienylacrylic acid or the other monofunctional monocarboxylic acid, such as drying or semi-drying oil acids, followed by esterification of the resulting partial ester with the other acid. The esterification step can be carried out by a solution method, i. e., under conditions in which an inert solvent, such as xylene or toluene, is employed to carry out the water from the reaction. Where desired, the solvent can be omitted.

Mixed esters can also be prepared by blending a mixed ester having a higher content of thienylacrylic ester than desired with a drying oil or other ester in an amount calculated to give the mixed ester having the desired proportions of thienylacrylic acid residues.

In the above processes, best results are obtained by the maintenance of an inert atmosphere through the use of an oxygen-free, inert gas and by carrying out the reaction at as low a temperature as is practicable. It is also necessary to avoid use of materials which liberate oxygen under reaction conditions, such as old samples of petroleum naphtha or turpentine. Where these precautions are not taken, the color is usually poorer, combined with decomposition and sometimes inferior drying.

Such oils or solutions as are obtained in the above processes can be formulated by conventional methods used with natural drying oils into various coating compositions. Blending of these new oils with natural drying oils also gives coating composition vehicles of unique properties.

The more detailed practice of the invention is illustrated in the following examples wherein the ingredients are by weight, such examples being given by way of illustration, and not as a limitation. Viscosities and colors are given on the Gardner-Holdt scale. Where cobalt drier is mentioned, sufficient of a 2% cobalt naphthenate solution is used to give the indicated proportion of cobalt based on the oil. The ester composition in the title of Example 1 is an index to the proportion of monocarboxylic acid radicals in the product.

EXAMPLE 1

*Glycerol mixed ester of linseed oil acids and β-(2-thienyl)acrylic acid*

| | Percent |
|---|---|
| β-(2-thienyl)acrylic acid glyceride | 20.0 |
| Linseed acids glyceride | 80.0 |

To 400 parts of alkali-refined linseed oil are added 95 parts of β-(2-thienyl)acrylic acid of melting point 144–145° C. (prepared by condensing 2-thienylaldehyde with methyl acetate in the presence of sodium methoxide followed by hydrolysis, or as disclosed by Biederman in Ber., 19, 1855 (1886)), 19 parts of refined glycerol, and 50 parts of toluene. The resulting mixture is refluxed for 5 hours at about 200° C. in an apparatus equipped to allow the condensation of toluene and water of esterification, separation of water, and return of toluene to the reaction vessel. An inert atmosphere of deoxidized nitrogen is maintained throughout the reaction, which is considered to be a simultaneous alcoholysis and esterification process. At the completion of the run, a vigorous current of the inert gas is blown through the reaction mixture at 200° C. for about 20 minutes in order to remove solvent and traces of unreacted acid. The oil is cooled, filtered, and is found to possess the following physical and analytical values: $N_D^{25}$ 1.5038; hydroxyl No. 7.66 (corrected for acidity); acid No. 6.48; viscosity D; color 3.5. With 0.03% cobalt, this oil dries over wood and steel in 10–15 hours at room temperature to light-colored, hard, glossy, and adherent films showing good durability after 7 months' outdoor exposure in Delaware. In comparison, linseed oil films are tacky, weak, and soft, and China-wood oil films are wrinkled. The drying of the new oil is accelerated by baking, e. g., at 100° C., and, if desired, driers can be omitted.

Films of the clear oil, as well as of the varnish and enamel described below, are superior in color at the tack-free stage to corresponding compositions containing β-(2-furyl)acrylic acid.

EXAMPLE 2

*Resin-oil varnish*

In a deoxidized nitrogen atmosphere, 23 parts of the oil of Example 1 is heated at 280–290° C. for 1 hour and 10 minutes. To the resulting oil of viscosity about Z–6 are added 11 parts of a limed rosin solution (64% limed rosin in mineral spirits) and enough manganese resinate and lead naphthenate to give 0.04% manganese and 4% lead, respectively. The resulting product is diluted to viscosity D with mineral spirits (about 50% solids). This varnish is of light color (4.1). Films are tack-free in 6–7 hours at room temperature and are similar in hardness to films of a perilla oil varnish of comparable oil length.

EXAMPLE 3

*Enamel*

Fifty-five (55) parts of the oil of Example 1, 95 parts of a white mill base containing titanium oxide, antimony oxide, and a linseed oil binder in the ratio of 0.67 pigment to 0.115 binder, 20 parts of a hydrocarbon thinner, and enough cobalt drier to give 0.03% cobalt are mixed to give a dispersed system. Flow-outs over white undercoats are tack-free, hard, and tough after drying overnight at room temperature. A corresponding composition in which the above-described mill base is reduced with linseed oil is not entirely free of tack after drying overnight.

Instead of using the thienylacrylic acid, any appropriate esterifiable derivative thereof may be used, such as the anhydride, acid halide, or an ester of an alcohol more volatile than the polyhydric alcohol whose ester is being prepared. The reaction temperatures can be varied widely, depending on reactants and method. With the acid halide or anhydride, temperatures in the neighborhood of 20–100° C. may be sufficient to produce esterification. The direct esterification and the ester interchange processes are preferably operated at temperatures above 100° C. and below 275° C.

Where the alcoholysis process is used, an ester interchange catalyst, such as litharge, sodium hydroxide, or sodium alcoholate, is preferably included in small amount, suitably from 0.01% to 1.0%. The reaction temperature for the alcoholysis can be varied from 150° C. to 300° C., depending on the oil, presence of catalyst, and degree of alcoholysis desired.

When the solution method heretofore mentioned is used, any inert water-immiscible liquid which dissolves the product is suitable, hydrocarbons being preferable, and the amount can be varied as desired. Suitable specific solvents include toluene, xylene, cymene, amyl benzene, tetrachloroethane, anisol, and cyclohexanone. Aromatic hydrocarbons, chlorinated solvents, ethers, and ketones are suitable in general. A boiling point in the range 100–200° C. is desirable.

In addition to glycerol, other polyhydric alcohols can be used in the present invention, such as ethylene glycol, diethylene glycol, triethylene glycol, hexamethylene glycol, tetramethylene glycol, erythritol, pentaerythritol, sorbitol, mannitol, cyclohexyl-1,2-dicarbinol, methyltrimethylolmethane, and p,p'-di(2-hydroxyethyl)benzene.

The monofunctional monocarboxylic acid or acids other than the thienylacrylic acid can be any monofunctional monocarboxylic acid, or any mixture of such acids. Specific additional acids that are suitable include perilla oil acids, oiticica oil acids, China-wood oil acids, dehydrated castor oil acids, soya bean oil acids, corn oil acids, cottonseed oil acids, coconut oil acids, oleic acid, stearic acid, lauric acid, p-toluic acid, butyric acid, crotonic acid, benzoic acid, furoic acid, sorbic acid, quinolinic acid, α-naphthionic acid, phenoxyacetic acid, and the like. The acids can be aromatic or aliphatic; open or closed chain, and, if the latter, monocyclic, polycyclic, homocyclic, or heterocyclic; saturated or unsaturated; straight or branched chain; and substituted or not by other groups or atoms, such as ether, ketone, halogen, etc., which do not interfere with the desired esterification reaction.

Any monofunctional thienylacrylic acid, as the term is hereinbefore explained, can be employed.

It may or may not contain substituent radicals of any kind which do not interfere with the esterification reaction. Such radicals can be aliphatic or aromatic; open or closed chain, and, if the latter, homocyclic or heterocyclic; saturated or unsaturated; and substituted or not by such inert groups as ether, ketone, halogen, or sulfide. The following specific thienylacrylic acids can be used in place of that of Example 1 and similar results obtained:

α-Methyl-β-(2-thienyl)acrylic acid,
β-(3-thienyl)acrylic acid,
α-(2-thienyl)-β-phenylacrylic acid,
α-Phenyl-β-(2-thienyl)acrylic acid, and
β-[2-(5-methyl)thienyl]acrylic acid.

In addition to the particular coating compositions of the example, the present esters can be formulated into any other desired type of paint, varnish, lacquer, or enamel. Thus, they can be blended by conventional methods with other varnish gums, such as copal, kauri, ester gum, oil-soluble phenol-formaldehyde resins, and rosin-extended phenol-formaldehyde resins, such as "Amberols"; with other resins, such as vinyl or urea-formaldehyde types; with cellulose derivatives, such as nitrocellulose, cellulose acetate, cellulose aceto-propionate, and ethyl cellulose; with auxiliary components of all kinds, such as waxes, solvents, pigments, and plasticizers, as needed and desired; and to particular advantage with fatty oils, especially drying or semi-drying oils, as is explained above.

These compositions can be applied to many kinds of surfaces and materials, for example, wood, metal, paper, linen, silk, cotton, textiles, and regenerated cellulose wrapping foils. Specific maufacturers that can be so produced are linoleum, patent leather, linoxyn-type materials, coated copper wire, oiled cloth, oiled silk, printing inks, and sandpaper. The products of the invention can also be made up into molding compositions, and the like. In addition, they can be employed as modifying agents for urea-formaldehyde and phenol-formaldehyde resins.

It will be apparent from the foregoing description that new esters having remarkable properties and a wide utility have been obtained. In particular, these esters are valuable substitutes for the natural drying oils in coating compositions, thereby reducing materially the dependence upon these natural products. The new esters have also many advantageous properties not shared by the natural oils, as, for example, the ability to form films which do not crystallize, wrinkle, or frost, as do films from the more rapidly drying natural oils. Furthermore, it is possible to take any fatty oil, including one that has a low order of drying, and, by substitutting a part of the fatty acid making up that oil by a thienyl-acrylic acid, to improve the drying and film properties greatly. The compositions of the present invention are particularly outstanding in that they combine the high film build of the natural drying oils (resulting from the much higher solids content at working viscosities) with the ability of resin-oil varnishes to dry rapidly to hard, tough films.

It is apparent that many widely different embodiments of this invention may be made without departing from the spirit and scope thereof; and, therefore, it is not intended to be limited except as indicated in the appended claims.

I claim:
1. A polyhydric alcohol ester of a thienylacrylic acid.
2. A glycerol ester of a thienylacrylic acid.
3. A glycerol ester of β-(2-thienyl)acrylic acid.
4. A polyhydric alcohol mixed ester of a thienylacrylic acid and another monofunctional monocarboxylic acid.
5. A glycerol mixed ester of a thienylacrylic acid and another monofunctional monocarboxylic acid.
6. A glycerol mixed ester of a thienylacrylic acid and the acids of a natural fatty oil.
7. A glycerol mixed ester of a thienylacrylic acid and the acids of a natural drying oil.
8. A glycerol mixed ester of β-(2-thienyl)acrylic acid and linseed oil acids.
9. A polyhydric alcohol mixed ester the acidic radicals of which comprise a thienylacrylic acid and a monofunctional monocarboxylic acid of different structure.

MERLIN MARTIN BRUBAKER.